(12) United States Patent
Ito et al.

(10) Patent No.: US 6,384,595 B1
(45) Date of Patent: *May 7, 2002

(54) METHOD OF AND APPARATUS FOR GENERATING A PULSE SIGNAL

(75) Inventors: Tomoaki Ito; Masami Tanaka; Tadashi Kubota; Yasuhiro Masuzaki; Osamu Uchiyama, all of Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,931

(22) Filed: Aug. 26, 1999

(30) Foreign Application Priority Data

Sep. 18, 1998 (JP) ............................................. 10-264680

(51) Int. Cl.[7] ................................................ G01B 7/30
(52) U.S. Cl. ............................ 324/207.13; 324/207.25; 324/174; 324/207.15
(58) Field of Search ........................... 324/207.11, 174, 324/207.15, 207.25, 207.26, 207.13; 310/155, 68 B; 307/106, 652

(56) References Cited

U.S. PATENT DOCUMENTS 6,140,727 A * 10/2000 Goto et al. .................. 310/155
6,160,322 A * 12/2000 Goto et al. .................. 307/106

* cited by examiner

*Primary Examiner*—Jay Patidar
(74) *Attorney, Agent, or Firm*—Kanesaka & Takeuchi

(57) ABSTRACT

A pulse signal generator comprising a magnetic element (1) able to cause a large Barkhausen jump; a detection member (2) for detecting a magnetic change in the magnetic element (1) to generate a pulse signal; and a pair of magnets (3, 4) provided on both sides of the magnetic element (1) such that their poles are opposed to each other; a magnetic circuit formation adjusting member (8, 9) attached to at least one of the magnets (3) so that when an object (5A) passes a pair of poles (3A, 4A) on one end of the magnets (3, 4), a magnetic field applied to the magnetic element changes to cause a large Barkhausen jump in the magnetic element (1), thus causing the detection member (2) to generate a pulse signal.

13 Claims, 8 Drawing Sheets

OBJECT FACES LOWER MAGNET.

THERE IS NO OBJECT.

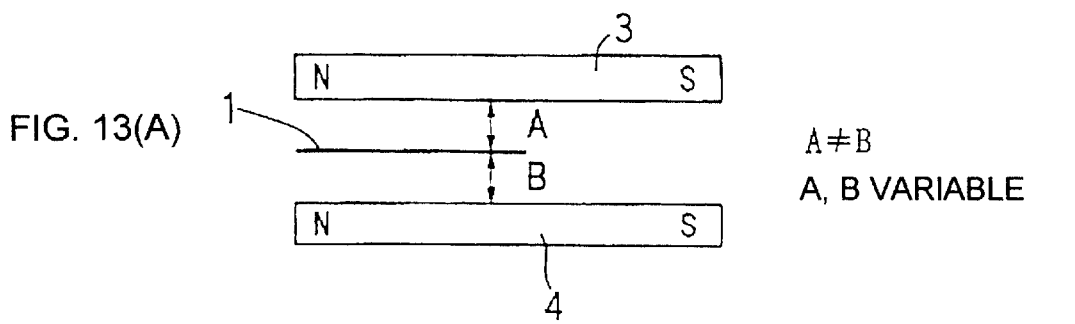
FIG. 13(A)    $A \neq B$
              A, B VARIABLE
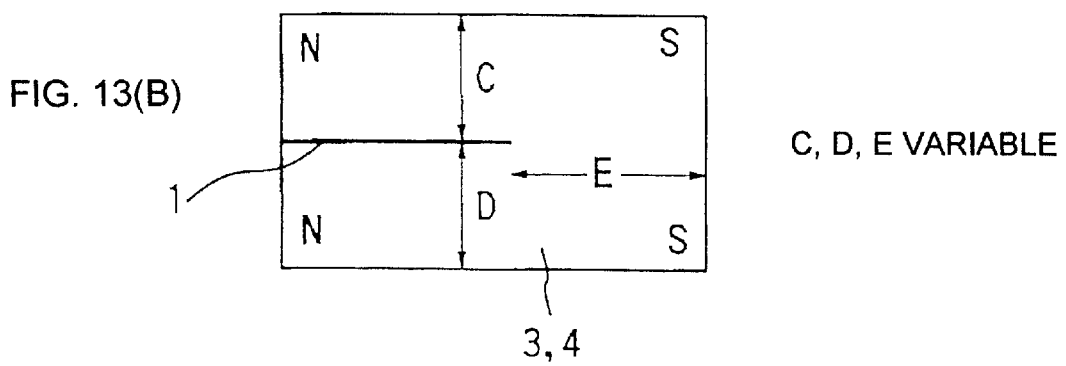
FIG. 13(B)    C, D, E VARIABLE
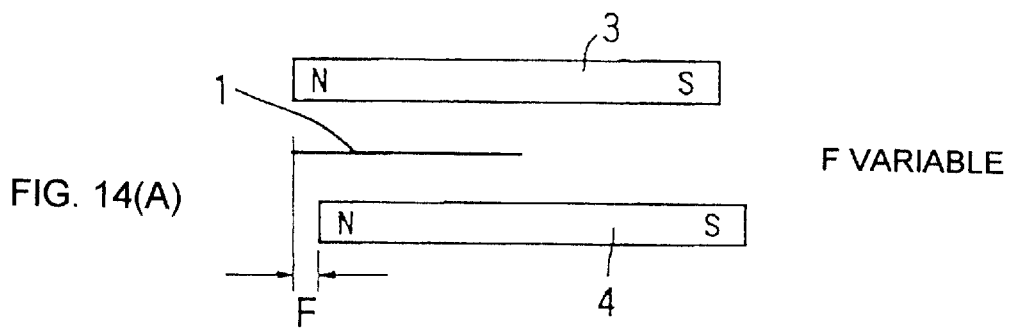
FIG. 14(A)    F VARIABLE
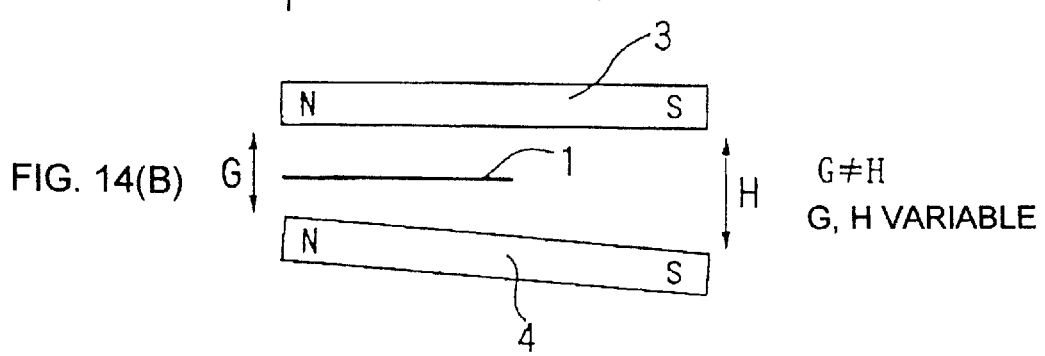
FIG. 14(B)    $G \neq H$
              G, H VARIABLE

MAGNETIC ELEMENT VERTICAL, HORIZONTAL, OR OBLIQUE

METHOD OF AND APPARATUS FOR GENERATING A PULSE SIGNAL

BACKGROUND OF THE INVENTION

1. Field of the Invention

The present invention relates to a method of and apparatus for generating a pulse signal.

2. Description of the Related Art

It is necessary to generate a pulse signal in response to the position or speed of a moving object or pulse signals in response to various operations for some automatic controls or electric or electronic equipment. An example is an electromagnetic pickup among various pulse signal generators of this type. This electromagnetic pickup consists of a magnetic element, magnets, and an electric coil such that movement of an object changes the magnetic density which, in turn, generates a voltage in the electric coil by electromagnetic induction. This voltage is used as a pulse signal.

This electromagnetic pickup, however, has the following disadvantages. When the object to be detected moves at a very low speed, the level of generated voltage is as low as the noise level. Consequently, it is necessary to provide a filter circuit in front of an amplifying circuit to eliminate noise before amplification. Conversely, when the speed of a moving object is very high, the generated voltage exceeds the maximum voltage of an amplifying circuit and needs a limiter. On the case of low speed, it has been proposed that an auxiliary ring having an enlarged diameter is attached to the object to increase the peripheral speed for detection. However, this proposition makes the size of equipment and the number of components larger. In addition, if the speed varies, the rising or falling time of the voltage varies. The detection of more accurate timing requires a complicated signal process. Moreover, the waveform of the voltage depends on the shape of the object.

Another example is a position, angular, or speed sensor using Hall effects such as shown in Japanese patent application Kokai No. 2-284082. This Hall effect type sensor employs a Hall element and a magnet. Movement of the object to be detected changes the magnetic flux upon the Hall element which, in turn, generates an electrical signal. This sensor, however, needs a separate power source to energize the Hall element. The generated electrical signal is not pulse but sinusoidal. Where the speed of an object is low, the rising voltage is decreased and the waveform is crashed. Like the above electromagnetic pickup, this sensor is susceptible to not only external magnetic field but also thermal drift and noise. In order to provide more accurate detection signals, a complicated processing circuit is required.

Japanese patent application Kokai No. 54-161257 discloses a pulse signal generator for use as a sensor. This pulse signal generator comprises a magnetically sensitive element made from a ferromagnetic body which consists of a relatively soft and magnetically anisotropic section and a relatively hard section, a first magnetic field source for magnetizing the magnetically sensitive element in the positive direction, a second magnetic field source for magnetizing the relatively soft section in the negative direction, a detection coil provided near the magnetically sensitive element, and a movable body for intermittently reducing the magnetization of the magnetically sensitive element by the first magnetic field source. Movement of the movable body causes a predetermined change in the magnetically sensitive element thereby generating a pulse voltage in the detection coil.

This pulse signal generator needs no power source and provides constant pulse voltages even when the object moves at very low speeds and is resistant to external magnetic field. Thus, it solves some of the problems presented by the electromagnetic pickup and Hall effect type sensor.

The conventional pulse signal generator, however, has limited applications and is not practical. First of all, it needs a movable body having slits. It is impossible to make the movable body smaller than the first and second magnetic field sources and the magnetically sensitive element. The slits are provided in the movable body radially so that the diameter of the movable body must be large. In addition, the movable body, the magnets, and the magnetically sensitive element must be parallel to each other. The magnets are so susceptible to external magnetic fields or metals that the operation is unstable. The generator is not always interchangeable for the electromagnetic pickup or Hall effect type sensor because of the special relationship with the object. For example, it is impossible to dispose it to detect the teeth of a gear directly.

SUMMARY OF THE INVENTION

Accordingly, it is an object of the invention to provide improvements in the pulse signal generating method and apparatus.

According to one aspect of the invention there is provided a method of generating a pulse signal, comprising the steps of providing a pair of magnets such that their opposite poles are faced to each other; providing a magnetic element between the magnets; adjusting at least one of a power, shape, and position of the magnets, a magnetic circuit for the magnets, and a position of the magnetic element; advancing an object from one of the opposite poles to the other to thereby change a magnetic field applied to the magnetic element, which causes a large Barkhausen jump in the magnetic element; and generating a pulse signal in response to the large Barkhausen jump.

According to another aspect of the invention there is provided a pulse signal generator comprising a magnetic element able to cause a large Barkhausen jump; a detection unit for detecting a magnetic change in the magnetic element to generate a pulse signal; and a pair of magnets provided on opposite sides of the magnetic element such that their poles are opposed to each other; a magnetic circuit formation adjusting member attached to at least one of the magnets so that when an object passes a pair of poles on one end of the magnets, a magnetic field applied to the magnetic element changes to cause a large Barkhausen jump in the magnetic element, thus causing the detection unit to generate a pulse signal.

According to still another aspect of the invention there is provided a pulse signal generator comprising a magnetic element able to cause a large Barkhausen jump; a detection unit for detecting a magnetic change in the magnetic element to generate a pulse signal; a pair of magnetic field sources consisting of magnets and magnetic circuit forming members provided on both sides of the magnetic element; a magnetic circuit formation adjusting member attached to at least one of the magnetic field sources such that magnetic poles on the same side of the magnetic field sources constitute a detection section which in response to sequential advance of an object changes a magnetic field applied to the magnetic element, causing a large Barkhausen jump in the magnetic element and a pulse signal in the detection unit corresponding to the large Barkhausen jump.

According to yet another aspect of the invention there is provided a pulse signal generator comprising a magnetic element able to cause a large Barkhausen jump; a detection unit for detecting a change in the magnetic element to generate a pulse signal; a pair of magnets provided on both sides of said magnetic element such that the poles are opposite to each other and having different magnetic powers, shapes, or volumes from each other such that magnetic poles on the same side of the magnets constitute a detection section which in response to sequential advancement of an object changes a magnetic field applied to the magnetic element to cause a large Barkhausen jump and generate a pulse signal in the detection unit corresponding to the large Barkhausen jump.

According to another aspect of the invention there is provided a pulse signal generator comprising a magnetic element able to cause a large Barkhausen jump; a detection unit for detecting a change in the magnetic element to generate a pulse signal; a pair of magnets provided on both sides of the magnetic element such that their magnetic poles are opposite to each other; positions of the magnets with respect to the magnetic element being variable; magnetic poles on the same side of the magnets constitute a detection section which, in response to sequential advancement of an object, changes a magnetic field applied to the magnetic element to cause a large Barkhausen jump in the magnetic element and a pulse signal in the detection unit corresponding to the large Barkhausen jump.

According to still another aspect of the invention there is provided a pulse signal generator comprising a magnetic element able to cause a large Barkhausen jump; a detection unit for detecting a magnetic change in the magnetic element to generate a pulse signal; a pair of magnetic field sources consisting of magnets and magnetic circuit forming members provided on both sides of the magnetic element such that their magnetic poles are opposite to each other; positions of the magnetic field sources with respect to the magnetic element being variable; magnetic poles on the same side of the magnetic field sources constitute a detection section which in response to sequential advancement of an object changes a magnetic field applied to the magnetic element to cause a large Barkhausen jump in the magnetic element and generate a pulse signal in the detection unit corresponding to the large Barkhausen jump.

According to yet another aspect of the invention there is provided a pulse signal generator comprising a magnetic element able to cause a large Barkhausen jump; a detection unit for detecting a magnetic change in the magnetic element to generate a pulse signal; a pair of magnets provided on both sides of the magnetic element such that their magnetic poles are opposite to each other; the magnets being variable in axial direction thereof or in parallelism with respect to each other; magnetic poles on the same side of the magnets constitute a detection section which, in response to sequential advancement of an object, changes a magnetic field applied to the magnetic element to cause a large Barkhausen jump in the magnetic element and generate a pulse signal in the detection unit corresponding to the large Barkhausen jump.

According to another aspect of the invention there is provided a pulse signal generator, wherein the magnets have different magnetic powers, shapes, or volume.

According to still another aspect of the invention there is provided a pulse signal generator, wherein the magnetic element is variable at its position with respect to the respective magnets.

BRIEF DESCRIPTION OF THE DRAWINGS

FIGS. 13(*a*) and (*b*) are side elevational and top plan views showing another adjusting technique for the pulse signal generator;

FIGS. 14(*a*) and (*b*) are side elevational and top plan views showing still another adjusting technique.

DESCRIPTION OF THE PREFERRED EMBODIMENTS

Figure 1:
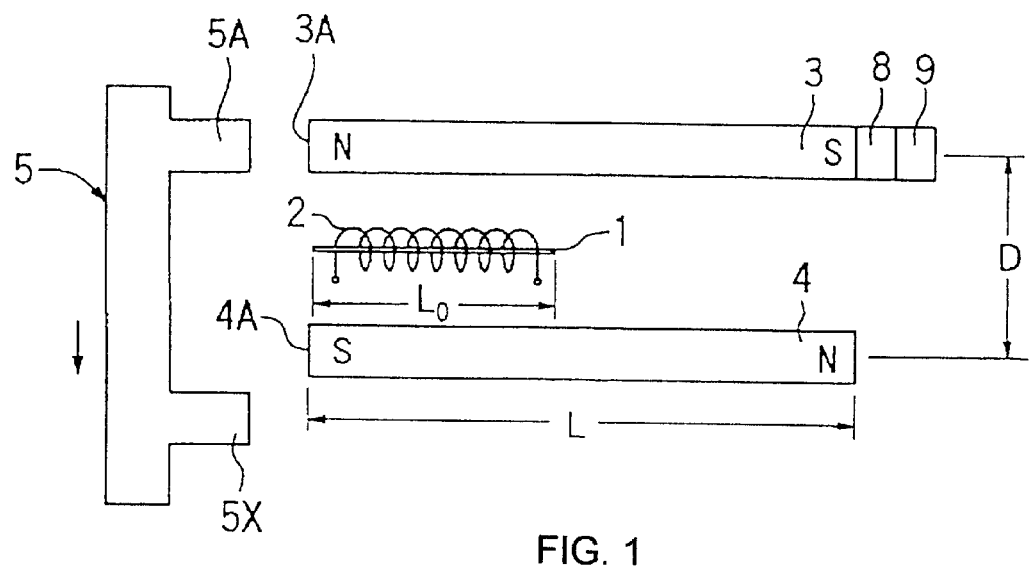
FIG. 1 is a side elevational view of a pulse signal generator according to an embodiment of the invention.

The magnetic element able to cause a large Barkhausen jump (also hereinafter merely "magnetic element") will first be described. The structure and operation of a wire-like composite magnetic element, for example, will be described. A wire made by drawing a ferromagnetic body has special magnetic characteristics. When a twisting stress is applied to the ferromagnetic wire, the peripheral region is more twisted than the central region so that the peripheral and central regions have different magnetic characteristics. When this condition is secured, a magnetic wire having different magnetic characteristics in the peripheral and central regions is provided. The magnetic characteristic in the peripheral region can be changed in the magnetization direction by a relatively low magnetic field. The central region, however, is changed in the magnetization direction by a magnetic field higher than that of the peripheral region. That is, the magnetic wire has a composite magnetic body consisting of the peripheral region which is readily magnetized and the central region which is difficult to magnetize. This composite magnetic wire is uniaxial anisotropic. The peripheral and central regions are called "soft" and "hard" layers, respectively. The composite magnetic wire is called a wire-like composite "magnetic element".

The magnetization directions of the hard and soft layers of the composite magnetic wire are not fixed. When an external magnetic field sufficiently high to reverse the magnetization direction of the hard layer in the axial direction of the magnetic wire is applied, both the soft and hard layers are magnetized in the same direction. Then, when an external magnetic field sufficiently high to magnetize only the soft layer is applied in the opposite direction, the soft and hard layers are magnetized in the opposite directions. Since the magnetic wire is uniaxial anisotropic, the magnetization direction of the soft layer is stable and kept by the magnetization of the hard layer when the external magnetic field is removed. This external magnetic field is called "set" magnetic field. Then, an external magnetic field in the direction opposite to the set magnetic field is applied to increase the magnetic field. When the external magnetic field exceeds a critical point, the magnetization direction of the soft layer is abruptly inverted. This magnetic field is called "critical magnetic field." The reverse phenomenon is like an avalanche wherein the magnetic wall of the soft layer is shifted to cause instant magnetic inversion. Consequently, the magnetization directions of the soft and hard layers are identical and return to the original state. The applied external magnetic field is higher than the critical magnetic field. This magnetic field is called "reset" magnetic field. This avalanche phenomenon is called large Barkhausen jump. The speed of the magnetization inversion depends on only the large Barkhausen jump and is irrelevant to the external magnetic field.

The magnetic element able to cause a large Barkhausen jump is not limited to the wire-like magnetic element but includes other magnetic elements having similar characteristics. The magnetic element able to cause a large Barkhausen jump includes magnetic elements having no composite layers. Fox example, Japanese patent application Kokai No. 4-218905 discloses a thin film making method by which a thin film magnetic body is formed which is useful as a magnetic element. The magnetic element may be thick film or plate-like sheet. Thus, the magnetic element able to cause a large Barkhausen jump includes a variety of magnetic elements.

In FIG. 1, a pulse generator comprises a magnetic element 1 having a wire-like shape, a detection coil 2 put around the magnetic element 1, and a pair of permanent magnets 3 and 4 provided on both sides of the magnetic element 1 such that their polarities are opposite to each other. The magnetic poles 3A and 4A of the permanent magnets 3 and 4 constitute a detection section which changes the magnetic field applied to the magnetic element 1 in response to sequential advancement of the teeth 5A, 5B, . . . 5X of a toothed wheel 5 or object to be detected, causing large Barkhausen jumps in the magnetic element 1, thus generating pulse signals in the detection coil 2 corresponding to the large Barkhausen jumps. Detachable magnetic circuit formation adjusting member 8 and 9 are attached to the S pole of the permanent magnet 3.

The permanent magnets 3 and 4 have a magnetic axis aligned with the axis of the magnetic element 1 and a length L greater than the length Lo of the magnetic element 1. The magnetic circuit formation adjusting members 8 and 9 are made from a magnetic block having a length less than the length L of the permanent magnets 3 and 4 and separately attached to or detached from the permanent magnet 3 to adjust the magnetic field applied to the magnetic element 1. The number of magnetic circuit formation adjusting members may be three or more. They may be a block of permanent magnet.

Figure 2:
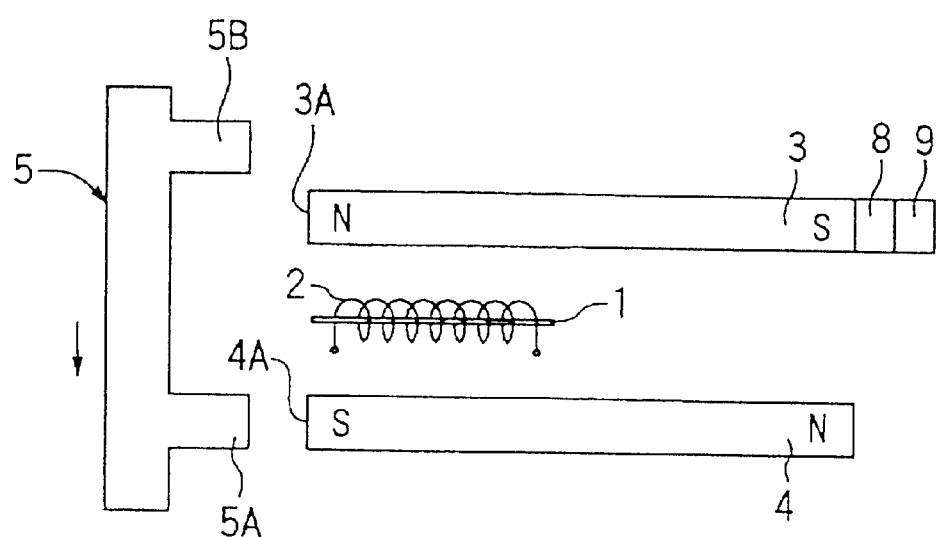
FIG. 2 is a side elevational view of the pulse signal generator which is in the reset condition.

The operation of the pulse signal generator will be described with respect to FIGS. 1 and 2. For simplicity, the case where no magnetic circuit formation adjusting members 8 and 9 are provided will be described. In FIG. 1, the tooth 5A of the toothed wheel 5 is opposed to the N-pole 3A of the permanent magnet 3 while the leading tooth 5X is off from the S-pole 4A of the other permanent magnet 4. Under this condition, the pulse signal generator is in the set condition. In FIG. 2, the toothed wheel 5 is advanced in the direction of an arrow so that the tooth 5A of the toothed wheel 5 is now opposed to the S-pole 4A of the permanent magnet 4 while the tailing tooth 5B is not yet opposed to the N-pole 3A of the other permanent magnet 3. Under this condition, the pulse signal generator is in the reset condition, causing a large Barkhausen jump in the magnetic element 1, which generates a pulse in the detection coil 2. In this way, every time a tooth of the toothed wheel 5 passes the magnetic poles 3A and 4A of the pair of permanent magnets 3 and 4, a pulse signal is generated in the detection coil 2.

According to the invention, the magnetic change of the magnetic element 1 by the large Barkhausen jump is detected by the detection coil 2 as a pulse voltage by electromagnetic induction. The large Barkhausen jump is caused in the magnetic element 1 without failure by the presence or absence of a tooth regardless the speed of teeth 5A, 5B, etc. of the toothed wheel 5 which is an object of detection. Thus, a pulse signal is generated in response to the large Barkhausen jump without failure. In this way, it is possible to make detection even when the speed of an object is very low. The pulse signals or voltages always keep a constant voltage and phase relationship. That is, the duration of the pulse voltage is constant at a predetermined level.

Figure 3:
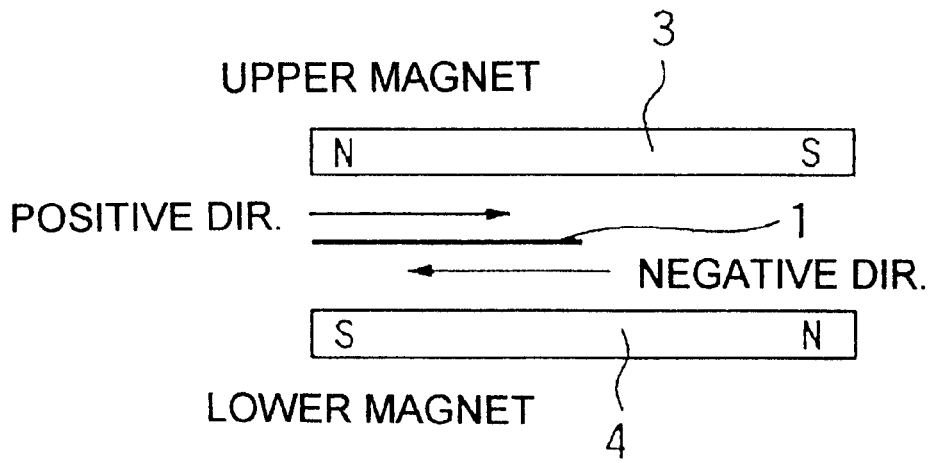
FIG. 3 is a side elevational view of the pulse signal generator to which no adjusting members are added.

The operational principle of the pulse signal generator where no magnetic circuit formation adjusting members 8 and 9 are provided will be described with respect to FIGS. 3–6. In FIG. 3, when there is no object such as the tooth of a toothed wheel, magnetic fields applied to the magnetic element 1 between the permanent magnets 3 and 4 are shown by arrows. If the magnetic element 1 is provided at the center of the two permanent magnets which are equal in size and power, the magnetic field upon the magnetic element 1 is zero (0) because the magnetic fields of the upper and lower magnets 3 and 4 in the positive and negative directions are equal in intensity and offset each other.

Figure 4:
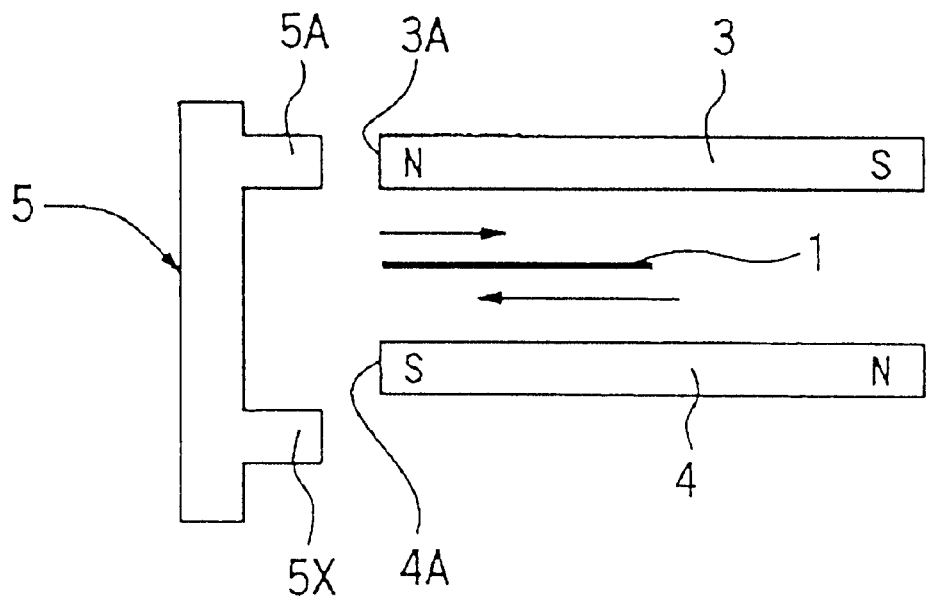
FIG. 4 is a side elevational view of the pulse signal generator wherein an object faces the upper magnet.

In FIG. 4, when the tooth 5A of the toothed wheel 5 is opposed to the N-pole 3A of the upper permanent magnet 3, the magnetic fields at the magnetic element 1 between the permanent magnets 3 and 4 are shown by arrows. Under this set condition, the magnetic field in the positive direction by the upper permanent magnet is reduced because a considerable amount of magnetic flux from the permanent magnet 3 flows into the tooth 5A of the magnetic object, whereas the magnetic field of the lower permanent magnet 4 in the negative direction is substantially equal to that of FIG. 3 because the tooth 5X is not opposed to the S-pole 4A of the permanent magnet 4. Consequently, under the set condition of FIG. 4, the magnetic field in the negative direction is applied to the magnetic element 1. This negative-direction magnetic field is called hereinafter "second magnetic field."

Figure 5:
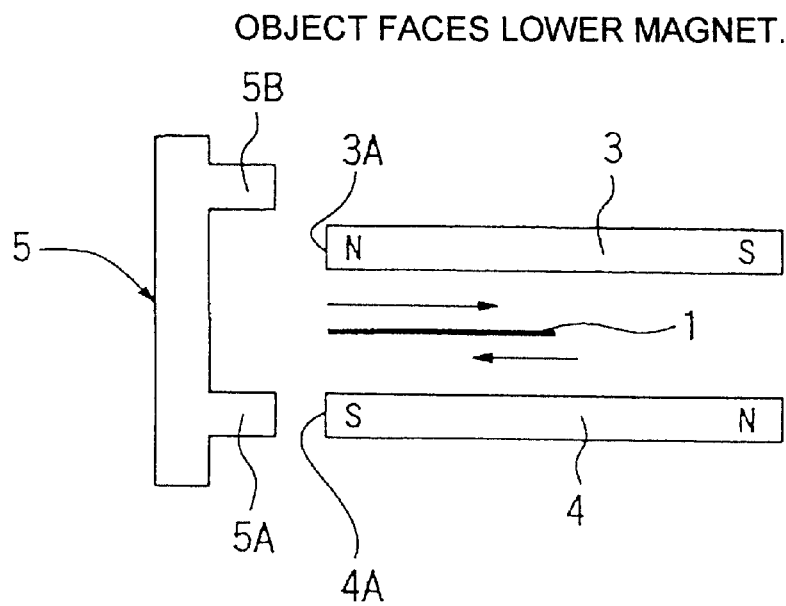
FIG. 5 is a side elevational view of the pulse signal generator wherein the object faces the lower magnet.

In FIG. 5, when the tooth 5A of the object moves away from the N-pole 3A of the upper permanent magnet 3 and faces the S-pole 4A of the lower permanent magnet 4, the magnetic fields at the magnetic element 1 are shown by arrows. The negative-direction magnetic field of the lower permanent magnet 4 is reduced by the fact that a considerable amount of magnetic flux flows into the tooth 5A of the object. On the other hand, the tooth 5B is off from the N-pole 3A of the upper permanent magnet 3 so that the positive-direction magnetic field of the permanent magnet 3 is substantially equal to that of FIG. 3. Consequently, under the reset condition of FIG. 5, the positive-direction magnetic field is applied to the magnetic element 1. This positive-direction magnetic field is called hereinafter "first magnetic field."

Figure 6:
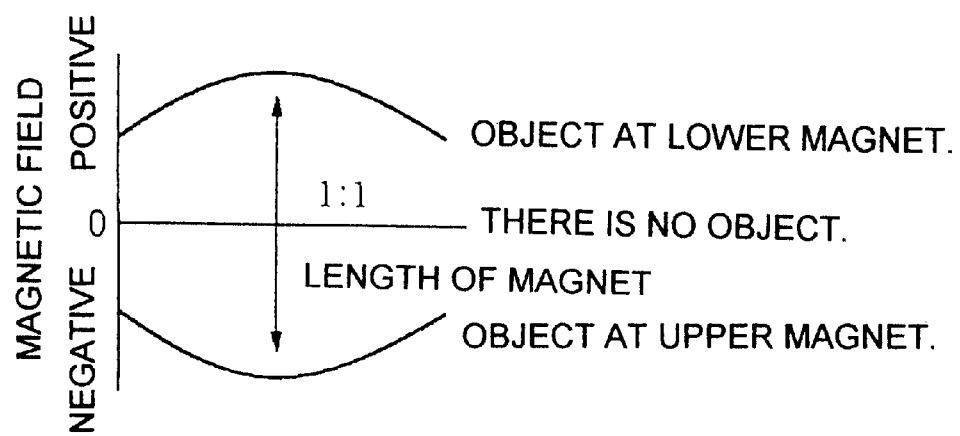
FIG. 6 is a graph showing the magnetic field applied to the magnetic element under the respective conditions of FIG. 3–5.

The magnetic fields applied to the magnetic element in FIGS. 3, 4, and 5 are shown in FIG. 6. By providing the magnetic element with the second and first magnetic fields in this order it is possible to cause a large Barkhausen jump and thus generate a pulse signal.

Figure 7:
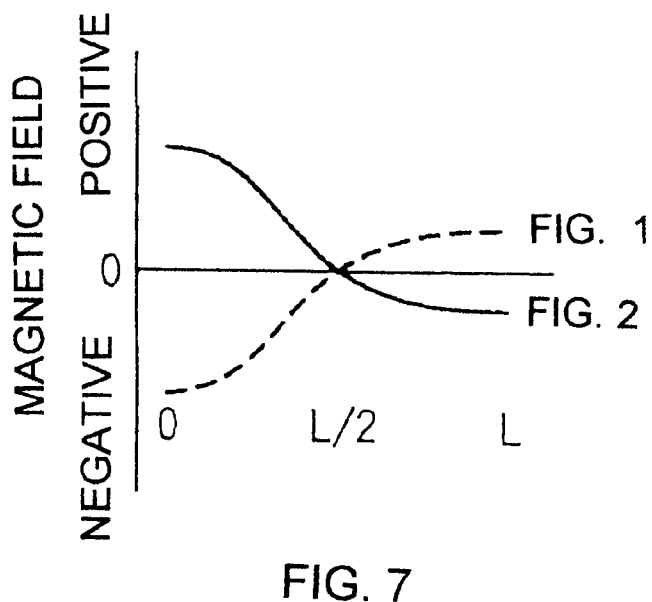
FIG. 7 is a graph explaining where the magnetic element is disposed.

The reason that the magnetic element 1 is provided within a front half range of the permanent magnets 3 and 4 will be described with reference to FIG. 7. When the object moves from the condition of FIG. 1 to FIG. 2, the magnetic field at the magnetic element 1 is changed as shown in FIG. 7. The curves of FIGS. 1 and 2 indicate the magnetic fields on the axis of the magnetic element 1 under the set and reset conditions of FIGS. 1 and 2, respectively. The magnetic field gap at a point 0 is greater than that of point L because the point 0 is closer to the object than the point L.

If the magnetic element 1 is provided across the entire length of the permanent magnets 3 and 4 from the point 0 to L, it is possible to use the positive, negative alternating magnetic fields from the point 0 to L/2, but the negative, positive alternating magnetic fields are used from the point L/2 to L so that the magnetic fields clash within the magnetic element 1. Consequently, changes in the magnetic field applied to the magnetic element between the set and reset conditions are so small that few satisfactory large Barkhausen jumps are provided.

When the magnetic element 1 is provided within either front or rear half range of the permanent magnets or either from the point 0 to L/2 or from the point L/2 to L, no magnetic fields clash. Especially, when the magnetic element 1 is provided within the front half range or from the point 0 to L/2, the alternating magnetic field gap is increased so that satisfactory large Barkhausen jumps are provided.

This will be supplemented by quantitative explanation. If the front and rear magnetic fields are 5 and 2 (absolute value), respectively, the alternating magnetic field is +5 where the magnetic element is provided in the front half, +2 where the magnetic element is provided in the rear half, and +3 in the front and rear sections where the magnetic element is provided across the entire length of the permanent magnets.

As being obvious from the above explanation, by changing the magnetic field to the magnetic element 1 from the second magnetic field to the first magnetic field it is possible to cause a large Barkhausen jump and generate a pulse signal. However, it is difficult to set the first and second magnetic fields at appropriate values according to assembling errors, the size and shape of the object, and the distance to the object. According to the embodiment magnetic circuit formation adjusting members 8 and 9 are provided to facilitate such adjustment of the magnetic field.

Figure 8:
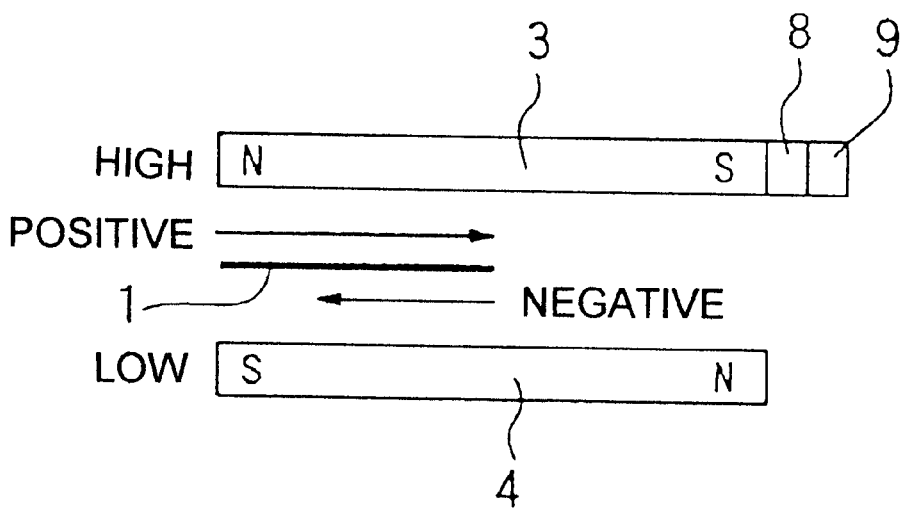
FIG. 8 is a side elevational view of the pulse signal generator for explaining how the pulse signal generator of FIG. 1 works.

The magnetic adjustment by the adjusting members 8 and 9 will be described with reference to FIGS. 8–11. In FIG. 8, where there is no object, the upper permanent magnet 3 is more powerful than the lower permanent magnet 4 by the addition of the adjusting members 8 and 9. Consequently, the magnetic field of the upper permanent magnet 3 to the magnetic element 1 is higher than that of the lower permanent magnet 4 so that the positive-direction magnetic field is higher than the negative-direction magnetic field, thus providing the positive-direction magnetic filed to the magnetic element 1.

Figure 9:
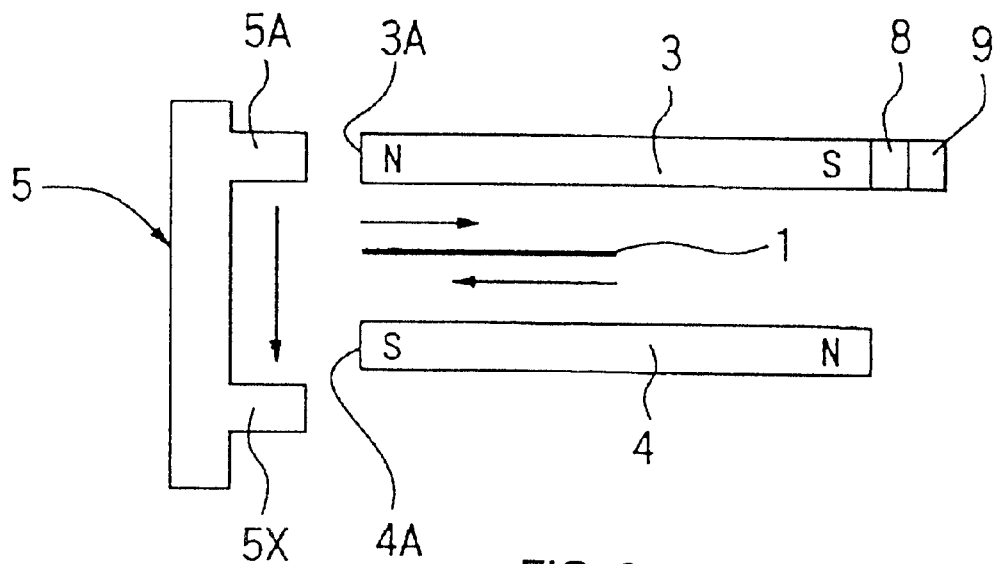
FIG. 9 is a side elevational view wherein an object faces the upper magnet.

Under such a set condition as shown in FIG. 9, the object is close to the upper permanent magnet 3 so that the positive-direction magnetic field is slightly lower than the negative-direction magnetic field, causing a negative-direction low magnetic field. This negative-direction low magnetic field is the second magnetic field.

Figure 10:
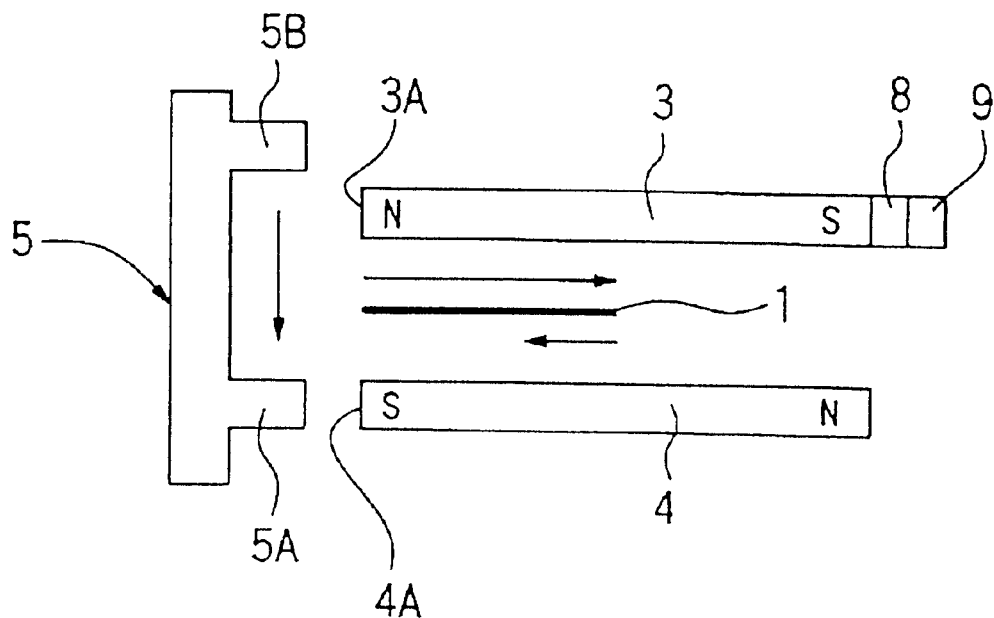
FIG. 10 is a side elevational view wherein the object faces the lower magnet.

Under the reset condition of FIG. 10, the object is close to the lower permanent magnet 4 so that the negative magnetic field is much lower than the positive-direction magnetic field. Consequently, a positive-direction high magnetic field is generated at the magnetic element 1. This positive-direction high magnetic field is the first magnetic field.

Figure 11:
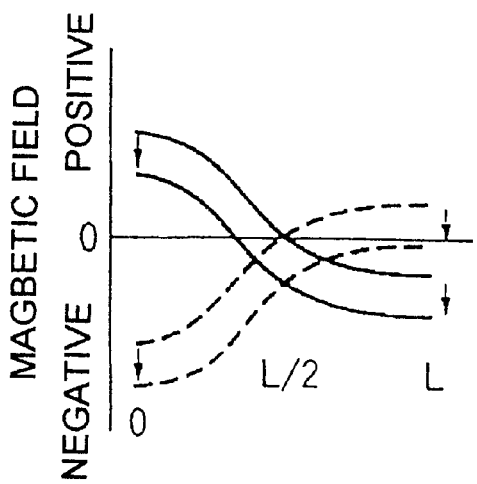
FIG. 11 is a graph showing how the magnetic field distribution is changed by the adjusting members.

As shown in FIG. 11, the positive and negative alternating magnetic fields upon the magnetic element 1 are moved by adding the adjusting members 8 and 9 to the permanent magnet 3. Thus, by adding or removing the adjusting members it is easy to adjust the magnetic field the magnetic field distribution (N:1) where a better large Barkhausen jump is provided.

Figure 12:
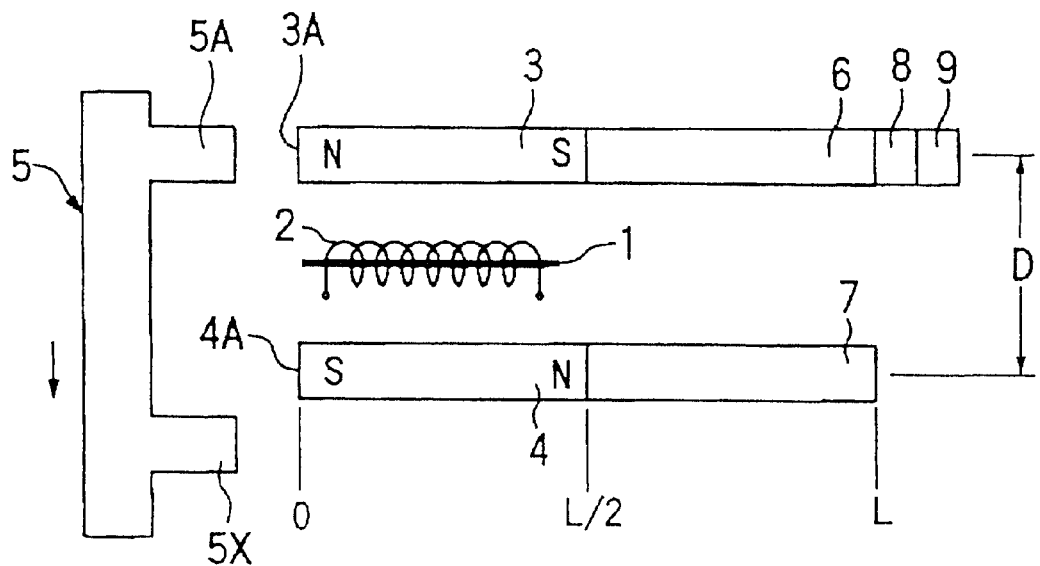
FIG. 12 is a pulse signal generator according to another embodiment of the invention.

In FIG. 12, a pulse signal generator according to another embodiment is shown. The essential structure and operation of this pulse signal generator are substantially the same as those of the above embodiment, and only different points will be described.

In this embodiment, there is provided a pair of magnetic field sources consisting of a pair of magnets 3 and 4 arranged such that the magnetic poles are opposite to each other and a pair of magnetic circuit forming members 6 and 7. The magnetic poles 3A and 4A on the same side constitute a detection section which changes the magnetic field applied to the magnetic element 1 in response to sequential advancement of the teeth 5A, 5B, . . . 5X of the toothed wheel 5, causing a large Barkhausen jump in the magnetic element 1 to generate a pulse signal in the detection coil 2. The detachable magnetic circuit formation adjusting members 8 and 9 are attached to the end of the magnetic circuit forming member 6.

By combining the permanent magnets and the magnetic circuit forming members to form the magnetic field sources it is possible to reduce the size of the permanent magnets to generate the predetermined magnetic field upon the magnetic element and the manufacturing cost. If the length of the magnetic element is different, by changing the lengths of the permanent magnets and magnetic circuit forming members of the magnetic field sources it is easy to adapt to the different length. The operation of the magnetic circuit formation adjusting members 8 and 9 are the same as that of the embodiment of FIG. 1, and the description is not repeated.

The distance between the permanent magnets 3 and 4 in FIGS. 1 and 12 may be fixed or variable. If the distance D is variable, it is easy to adapt the generator to an object having a different pitch of teeth, thereby generating a pulse signal accurately.

The wire-like magnetic element 1 may be replaced by a thin-film, thick-film, or plate-like magnetic element. When one of these alternatives is used, the detection coil 2 may be a planar coil. Moreover, the magnetic element may be replaced by a single-layer magnetic element.

The permanent magnets 3 and 4 may be replaced by electromagnets or the like. The detection coil may be substituted by a hall element, MR element, or resonance circuit.

The magnetic circuit formation adjusting members may be replaced by the following members or techniques.

The magnetic powers of the magnets 3 and 4 are made different so that the magnetic fields upon the magnetic element 1 are different, and the magnetic field ratio upon the magnetic element 1 under the set and reset conditions is made N:1 by changes caused only by the object. The magnetic powers are made different by using different powers, the volumes or shapes of magnets.

In FIG. 13(a), the distance A between the magnet 3 and the magnetic element 1 and the distance B between the magnet 4 and the magnetic element 1 are made different and variable. In FIG. 13(b), the distance C or D between the magnetic element 1 and one end or the other end of the magnets 3 and 4 and the distance E between the magnetic element 1 and the rear end of the magnets 3 and 4 are made variable.

In FIG. 14(a), the difference F between the front ends of the magnetic element 1 and the magnet 4 is made variable. In FIG. 14(b), the distances G and H between the front ends and rear ends of the magnets 3 and 4 are made different and variable.

Figure 15:
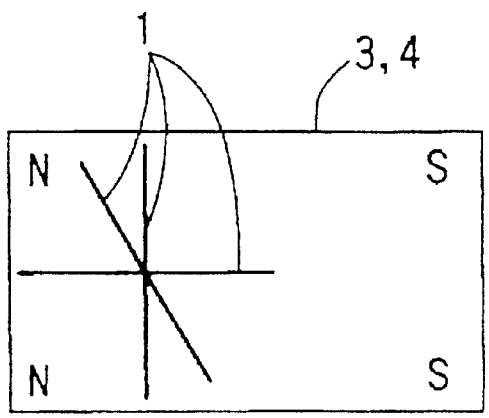
FIG. 15 is a top plan view showing yet another adjusting technique for the pulse signal generator.

In FIG. 15, the magnetic element 1 is provided vertically, horizontally, or obliquely with respect to the magnets 3 and 4.

The above various techniques may be combined to produce the desired effects according to the shape and size of an object.

According to the invention it is possible to detect very low liner or rotary speed. The resulting pulse signals have a constant voltage and phase relationship and are distinct from noise and need no limiter.

It is possible to provide a very high resolution and accurate timing.

The magnetic element is flanked by the magnets so that it is resistant against external magnetic influence.

As long as an object is magnetic, it may be detected and no separate movable body is necessary. Also, it is possible to make the generator need no power. It is easy to make it explosion proof.

The generator is so simple that it is made up of magnets, a magnetic element, and a detection coil.

Where the magnetic field sources are made up of magnets and magnetic circuit forming members, the size of the permanent magnets is reduced, resulting in the reduced manufacturing cost.

The magnetic field adjusting members make it easy to adjust the magnetic field for causing a large Barkhausen jump.

What is claimed is:

1. A method of generating a pulse signal, comprising the steps of:
    providing a pair of magnets such that their opposite poles are faced to each other;
    providing a magnetic element between said magnets;
    setting a positive-direction magnetic field and a negative-direction magnetic field applied to said magnetic element at appropriate values by adjusting at least one of a power, shape, and position of said magnets, a magnetic circuit for said magnets, and a position of said magnetic element;
    advancing an object from one of said opposite poles to the other to thereby change a magnetic field applied to said magnetic element, which causes a large Barkhausen jump in said magnetic element; and
    generating a pulse signal in response to said large Barkhausen jump.

2. A pulse signal generator comprising:
    a magnetic element able to cause a large Barkhauen jump;
    detecting means for detecting a magnetic change in said magnetic element to generate a pulse signal; and
    a pair of magnets provided on opposite sides of said magnetic element such that their poles are opposed to each other;
    at least one magnetic circuit formation adjusting member detachably attached to at least one of said magnets to set a positive-direction magnetic field and a negative-direction magnetic field applied to said magnetic element at appropriate values, wherein
        when an object passes a pair of poles on one end of said magnets, a magnetic field applied to said magnetic element changes to cause a large Barkhausen jump in said magnetic element, thus causing said detection means to generate a pulse signal.

3. A pulse signal generator according to claim 2, wherein said magnets have different magnetic powers, shapes, or volume.

4. A pulse signal generator according to claim 2, wherein said magnetic element is variable at its position with respect to said respective magnets.

5. A pulse signal generator comprising:
    a magnetic element able to cause a large Barkhausen jump;
    detecting means for detecting a magnetic change in said magnetic element to generate a pulse signal;
    a pair of magnetic field sources consisting of magnets and magnetic circuit forming members provided on both sides of said magnetic element;
    at least one magnetic circuit formation adjusting member detachably attached to at least one of said magnetic field sources to set a positive-direction magnetic field and a negative-direction magnetic field applied to said magnetic element at appropriate values, wherein
        magnetic poles on the same side of the magnetic field sources constitute a detection section which in response to sequential advance of an object changes a magnetic field applied to said magnetic element, causing a large Barkhausen jump in said magnetic element and a pulse signal in said detection means corresponding to said large Barkhausen jump.

6. A pulse signal generator according to claim 5, wherein said magnets have different magnetic powers, shapes, or volume.

7. A pulse signal generator according to claim 5, wherein said magnetic element is variable at its position with respect to said respective magnets.

8. A pulse signal generator comprising:
    a magnetic element able to cause a large Barkhausen jump;
    detecting means for detecting a magnetic change in said magnetic element to generate a pulse signal;
    a pair of magnets provided on both sides of said magnetic element such that the poles are opposite to each other and having different magnetic powers, shapes, or volumes from each other; and
    at least one magnetic circuit formation adjusting member detachably attached to at least one of said magnets to set a positive-direction magnetic field and a negative-direction magnetic field applied to said magnetic element at appropriate values, wherein
        magnetic poles on the same side of said magnets constitute a detection section which in response to sequential advancement of an object changes a magnetic field applied to said magnetic element to cause a large Barkhausen jump and generate a pulse signal in said detection means corresponding to said large Barkhausen jump.

9. A pulse signal generator according to claim 8, wherein said magnetic element is variable at its position with respect to said respective magnets.

10. A pulse signal generator comprising:

a magnetic element able to cause a large Barkhausen jump;

detection means for detecting a change in said magnetic element to generate a pulse signal;

a pair of magnets provided on both sides of said magnetic element such that their magnetic poles are opposite to each other;

positions of said magnetic element with respect to said magnets being variable to change a magnetic field applied to said magnetic element, thus setting a positive-direction magnetic field and a negative-direction magnetic field at appropriate values, wherein magnetic poles on the same side of said magnets constitute a detection section which in response to sequential advancement of an object changes a magnetic field applied to said magnetic element to cause a large Barkhausen jump in said magnetic element and a pulse signal in said detection means corresponding to said large Barkhausen jump.

11. A pulse signal generator according to claim 10, wherein said magnets have different magnetic powers, shapes, or volume.

12. A pulse signal generator comprising:

a magnetic element able to cause a large Barkhausen jump;

detection means for detecting a magnetic change in said magnetic element to generate a pulse signal;

a pair of magnetic field sources consisting of magnets and magnetic circuit forming members provided on both sides of said magnetic element such that their magnetic poles are opposite to each other;

positions of said magnetic field sources with respect to said magnetic element being variable to change a magnetic field applied to said magnetic element, thus setting a positive-direction magnetic field and a negative-direction magnetic field at appropriate values, wherein magnetic poles on the same side of said magnetic field sources constitute a detection section which in response to sequential advancement of an object changes a magnetic field applied to said magnetic element to cause a large Barkhausen jump in said magnetic element and generate a pulse signal in said detection means corresponding to said large Barkhausen jump.

13. A pulse signal generator comprising:

a magnetic element able to cause a large Barkhausen jump;

detection means for detecting a magnetic change in said magnetic element to generate a pulse signal;

a pair of magnets provided on both sides of said magnetic element such that their magnetic poles are opposite to each other;

said magnets being variable in axial direction thereof or parallelism with respect to each other to change a magnetic field applied to said magnetic element, thus setting a positive-direction magnetic field and a negative-direction magnetic field at appropriate values, wherein magnetic poles on the same side of said magnets constitute a detection section which in response to sequential advance of an object changes a magnetic field applied to said magnetic element to cause a large Barkhausen jump in said magnetic element and generate a pulse signal in said detection means corresponding to said large Barkhausen jump.

* * * * *